United States Patent
Dunham et al.

(10) Patent No.: US 11,237,960 B2
(45) Date of Patent: Feb. 1, 2022

(54) METHOD AND APPARATUS FOR ASYNCHRONOUS MEMORY WRITE-BACK IN A DATA PROCESSING SYSTEM

(71) Applicant: Arm Limited, Cambridge (GB)

(72) Inventors: Curtis Glenn Dunham, Austin, TX (US); Pavel Shamis, Austin, TX (US)

(73) Assignee: Arm Limited, Cambridge (GB)

( * ) Notice: Subject to any disclaimer, the term of this patent is extended or adjusted under 35 U.S.C. 154(b) by 75 days.

(21) Appl. No.: 16/418,346

(22) Filed: May 21, 2019

(65) Prior Publication Data

US 2020/0371913 A1 Nov. 26, 2020

(51) Int. Cl.
G06F 3/06 (2006.01)
G06F 12/00 (2006.01)
G06F 13/00 (2006.01)
G06F 12/0804 (2016.01)

(52) U.S. Cl.
CPC .... G06F 12/0804 (2013.01); *G06F 2212/608* (2013.01)

(58) Field of Classification Search
CPC .................................................. G06F 12/0804
USPC ....................................................... 711/141
See application file for complete search history.

(56) References Cited

U.S. PATENT DOCUMENTS

| | | | | |
|---|---|---|---|---|
| 5,353,415 A | * | 10/1994 | Wolford | G06F 12/0831 710/310 |
| 5,754,888 A | * | 5/1998 | Yang | G06F 3/0601 710/52 |
| 6,574,709 B1 | * | 6/2003 | Skazinski | G06F 11/2092 711/119 |
| 6,732,124 B1 | * | 5/2004 | Koseki | G06F 11/1435 |
| 6,813,678 B1 | * | 11/2004 | Sinclair | G06F 3/0626 711/103 |
| 7,076,606 B2 | * | 7/2006 | Orsley | G06F 11/1076 707/999.202 |
| 7,181,573 B2 | * | 2/2007 | Wolrich | G06F 12/0875 710/310 |
| 7,333,106 B1 | | 2/2008 | Wu et al. | |

(Continued)

OTHER PUBLICATIONS

Katsuyoshi Kitai, Tadaaki Isobe, Yoshikazu Tanaka, Yoshiko Tamaki, Masakazu Fukagawa, Teruo Tanaka, and Yasuhiro Inagami. 1993. Parallel processing architecture for the Hitachi S-3800 shared-memory vector multiprocessor. In Proceedings of the 7th international conference on Supercomputing (ICS '93). ACM, New York, NY, USA, 288-297.

*Primary Examiner* — Mohamed M Gebril
(74) *Attorney, Agent, or Firm* — Leveque Intellectual Property Law, P.C.

(57) ABSTRACT

A data processing system includes a processor, a memory system, a cache controller and a cache accessible by the processor via the cache controller. The cache controller provides an asynchronous interface between the processor and the memory system. Instructions, issued by the processor to the cache controller, are completed by the cache controller without blocking the processor. In addition, the cache controller tracks a completion status of the memory operation associated with each instruction and enables the completion status to be queried by the processor. Status of the memory operation may be recorded as an entry in a log, where the log, or a property of the log, is accessible by the processor.

16 Claims, 9 Drawing Sheets

(56) References Cited

U.S. PATENT DOCUMENTS

| | | | |
|---|---|---|---|
| 9,021,303 B1* | 4/2015 | DeSouter | G06F 11/1417 714/20 |
| 10,956,324 B1* | 3/2021 | Giles | G06F 9/3855 |
| 2003/0041216 A1* | 2/2003 | Rosenbluth | G06F 9/3885 711/141 |
| 2003/0046488 A1* | 3/2003 | Rosenbluth | G06F 9/30021 711/108 |
| 2003/0056062 A1* | 3/2003 | Prabhu | G06F 12/0804 711/143 |
| 2003/0191895 A1* | 10/2003 | Chen | G06F 5/10 711/118 |
| 2005/0080762 A1* | 4/2005 | Nakashima | G06F 11/1435 |
| 2005/0114592 A1* | 5/2005 | Jin | G06F 12/0866 711/113 |
| 2006/0075060 A1 | 4/2006 | Clark | |
| 2006/0212659 A1* | 9/2006 | Dieffenderfer | G06F 12/0833 711/141 |
| 2008/0071842 A1* | 3/2008 | Tokuda | G06F 11/1469 |
| 2008/0120470 A1* | 5/2008 | Dhamankar | G06F 12/0804 711/135 |
| 2008/0229009 A1* | 9/2008 | Gaither | G06F 12/0811 711/113 |
| 2011/0119451 A1* | 5/2011 | Fuller | G06F 12/0802 711/144 |
| 2012/0221774 A1 | 8/2012 | Atkisson et al. | |
| 2014/0136786 A1* | 5/2014 | Carpenter | G06F 9/466 711/125 |
| 2014/0143476 A1* | 5/2014 | Sela | G06F 3/0619 711/103 |
| 2015/0113224 A1* | 4/2015 | Achilles | G06F 12/0891 711/135 |
| 2015/0309742 A1* | 10/2015 | Amidi | G06F 12/0868 714/758 |
| 2016/0034398 A1 | 2/2016 | Wendel et al. | |
| 2016/0154663 A1* | 6/2016 | Guthrie | G06F 11/1458 718/1 |
| 2016/0188414 A1* | 6/2016 | Jayakumar | G11C 7/20 711/103 |
| 2017/0091215 A1* | 3/2017 | Beard | G06F 16/184 |
| 2017/0091262 A1* | 3/2017 | Beard | G06F 16/172 |
| 2017/0199687 A1* | 7/2017 | Kohara | G06F 12/0246 |
| 2017/0237677 A1* | 8/2017 | Zhao | H04L 47/6245 711/141 |
| 2018/0024919 A1* | 1/2018 | Geml | G06F 3/061 711/103 |
| 2019/0042453 A1 | 2/2019 | Basak et al. | |
| 2020/0142769 A1 | 5/2020 | Mola | |
| 2020/0371913 A1* | 11/2020 | Dunham | G06F 12/0895 |

* cited by examiner

METHOD AND APPARATUS FOR ASYNCHRONOUS MEMORY WRITE-BACK IN A DATA PROCESSING SYSTEM

CROSS-REFERENCE TO RELATED APPLICATIONS

This application is related to the following co-pending U.S. patent application: application Ser. No. 16/418,380, entitled "METHOD AND APPARATUS FOR ARCHITECTURAL CACHE TRANSACTION LOGGING," filed on even date herewith, which is incorporated herein in its entirety.

BACKGROUND

There is increased use of persistent memories in data processing system, which may be considerable slower than memories such as dynamic random access memory (DRAM).

Persistent memory may be treated both as storage and as memory. Data processing systems generally distinguish between storage operations (such as reading and writing to disk), and corresponding memory access operations (such as accessing DRAM). Storage operations are slow compared to memory operations and are typically performed by an Operating System (OS). For example, a read( ) or write( ) instruction in an application may be implemented as a request to the OS. Such requests may be performed synchronously, which means that the application making the request waits for the request to complete. The waiting time may be used for processing a different thread or performing speculative instructions. Alternatively, a storage operation may be performed asynchronously, which means that the application continues executing but completion of the request must produce a notification in the form of a flag to be polled or an interrupt signal.

In contrast, memory operations are generally performed synchronously, with load and store instructions waiting in a central processing unit (CPU) pipeline until complete.

While an OS call is convenient for an application programmer, it can result in reduced performance. In addition, many functions performed by an OS are privileged, meaning that they cannot be performed directly by the unprivileged software of a user application. As a result, user level applications that avoid Operating System services for performance reasons are becoming pervasive. For example, a unikernel is a fixed-purpose machine image obtained by compiling an application with a minimal set of OS libraries, configuration code. The image can then be executed on hardware directly or via a hypervisor.

A CPU typically interacts with a level 1 (L1) cache at the top of hierarchical memory system. A cache controller manages data flow between the cache and lower (or downstream) memory resources, such as DRAMs. However, an instruction set architecture may contain some instructions that control data flow from the cache. An example would be an instruction (clean, flush etc.) to write some or all the contents of the cache back to main memory. Such memory operations are performed synchronously. This can lead to reduced performance of the data processing system when data is moved to a slower memory, such as a persistent memory.

Neither an asynchronous interface to memory via an OS call or the current synchronous memory interface are efficient approaches for interfacing with slower memory, such as persistent memory, for the reasons given above. Therefore, there exists a need for a new data processing architecture that provides an asynchronous interface to memory.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
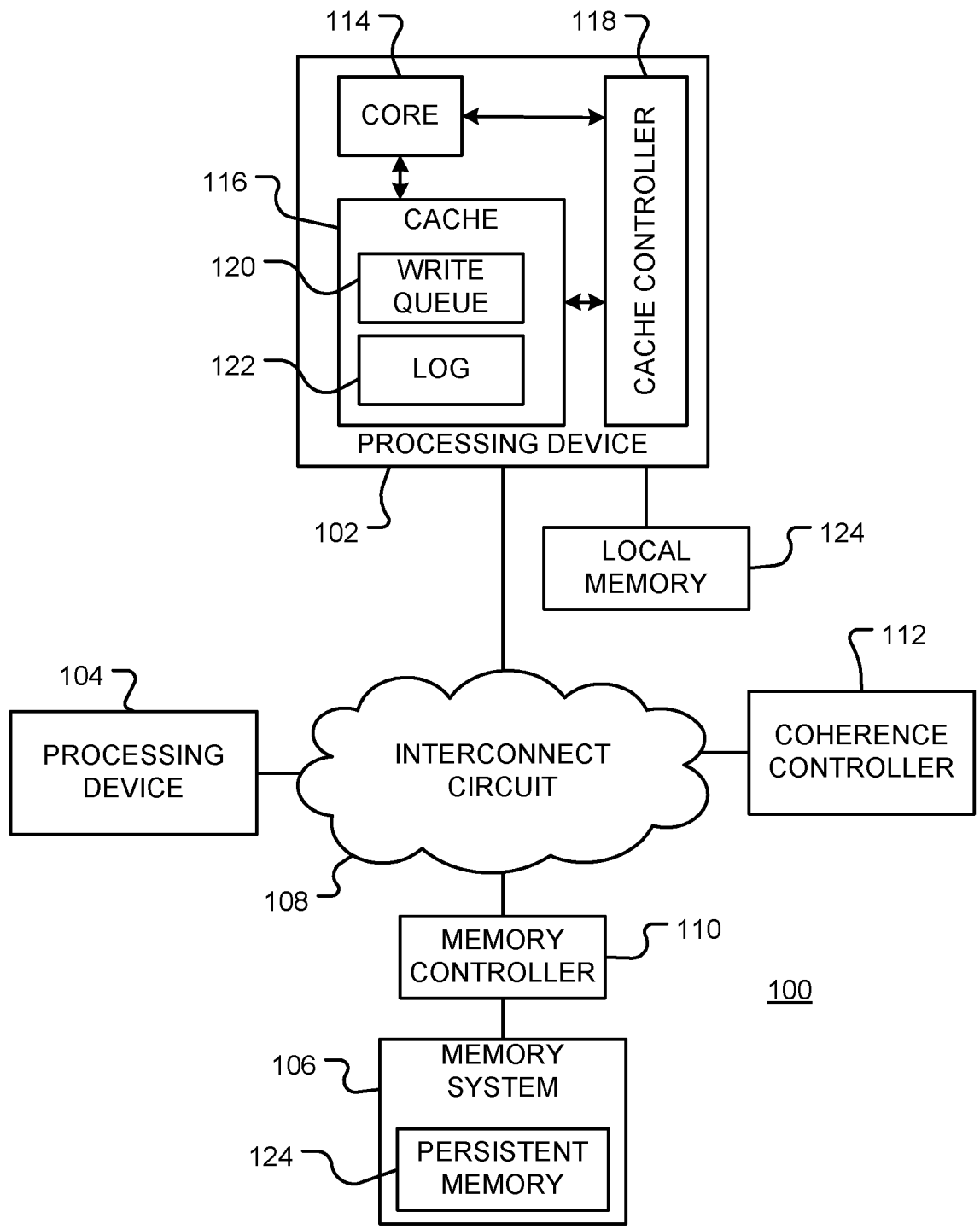
FIG. 1 is a diagrammatic representation of a data processing system, in accordance with various representative embodiments.

The various apparatus and devices described herein provide a hardware mechanism for asynchronous store operations in data processing system. In one embodiment, completion of an operation to store to a volatile memory, persistent memory or a disk store is decoupled from program order by use of a notification scheme in conjunction with in-cache logging.

While this disclosure is susceptible of embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

As used herein, the term processor, controller or the like may encompass a processor, controller, microcontroller unit (MCU), microprocessor, and other suitable control elements. It will be appreciated that embodiments of the disclosure described herein may be comprised of one or more conventional processors and unique stored program instructions that control the one or more processors to implement, in conjunction with certain non-processor circuits, some, most, or all of the functions described herein. The non-processor circuits may include, but are not limited to, memory devices, an interconnect fabric, signal drivers, clock circuits, power source circuits, and input/output devices. Some or all functions could be implemented by a state machine that has no stored program instructions, or in one or more application specific integrated circuits (ASICs), in which each function or some combinations of certain of the functions are implemented as custom logic. Of course, a combination of these approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The present application discloses new architectural facilities for a data processing system. The new facilities improve the operation of the data processing system by providing an ability for user level applications to perform asynchronous (also known as non-blocking) write operations to any level of a memory system. In particular, the new facilities enable asynchronous write operations to persistent memory. In one embodiment, an asynchronous file descriptor write operation (such as a write to a hard disk) is performed by the hardware without OS intervention. Previously, such operations were only available for storage operations (rather than memory operations) and would be performed by an OS. For example, the UNIX® Operating System (a trademark of The Open Group) provides the asynchronous write instruction aio_write( ), together with a corresponding instruction aio_return( ) to check the status of the write operation.

Herein, the term 'persistent memory' shall mean any memory the contents of which are available after a power cycle or other reboot. 'Persistent memory' shall include non-volatile memory such as core memory, flash memory, magneto-resistive random access memory (MRAM), ferroelectric RAM (F-RAM), phase-change RAM (PCRAM), resistive RAM (ReRAM), correlated-electron RAM (Ce-RAM), Intel® 3D Xpoint™ (a trademark of Intel Corporation or its subsidiaries) and other memory technologies that are inherently non-volatile. In addition, 'persistent memory' shall include main memory that is automatically backed-up up to non-volatile memory (such as flash memory) and reloaded following a power cycle. For example, non-volatile, dual inline memory module (NVDIMM-N) combines a DIMM, DRAM, flash storage and small power supply in the same module.

While the latencies of persistent storage technologies are unlikely to become as small as those of dynamic random access memory (DRAM), they are approaching such latencies. However, persistent memory technologies can present storage through the memory interface, resulting in accesses much slower than cache misses. It would be highly deleterious to performance to use normal store barriers with such memory, but software still must be aware of when an output has completed.

FIG. 1 is a diagrammatic representation of a data processing system 100 in accordance with an embodiment of the present disclosure. Referring to FIG. 1, processing devices 102 and 104 share a common data resource—memory system 106 in this embodiment. Any number of processing devices and data resources may be present. The processing devices access memory system 106 via an interconnect circuit 108 and a memory controller 110. Memory access requests by processing devices 102 and 104 are monitored and handled by coherence controller 112. A processing device, such as device 102, may include one or more processing cores 114, one or more caches 116 and cache controller 118.

The present application provides a hardware mechanism for asynchronous (non-blocking) writes. In a first embodiment, the instruction set architecture provides an instruction that writes ("cleans") cached data back to a selected memory level or resource, such as a persistent memory, in conjunction with an asynchronous notification indicating completion of the write operation. In one embodiment, the notification is accomplished by logging the address operand of the instruction through a logging mechanism. In one embodiment, the address operand is recorded in a log together with an indication of the status of the corresponding operation. For example, a CCA (Cache Clean Asynchronous) instruction might take an address as an operand or argument. The instruction writes back a cache line (of the given address) to persistent memory (or other designated memory resource) and updates a log or other notification record.

In a second embodiment, the instruction set architecture provides a "Asynchronous Store Barrier" (ASB) instruction.

The ASB instruction, in effect, is a request for notification when all prior writes to the designated memory level (e.g. persistent memory) have completed. Unlike a synchronous barrier instruction, the core is not stalled while waiting for the writes to complete. In one embodiment, the argument of ASB instruction is a token, such as a memory address. When all writes, prior to ASB, to the designated memory have completed, this token is written to a cache transaction log with an appropriate syndrome. Completion may be signaled in other ways. The ASB instruction is a barrier in the sense that is separates groups of write instructions.

In one embodiment, the operation has two parts: a "start" instruction and the ASB instruction. Following a "start" instruction, the cache controller beings tracking the completion status of instructions, such as cache clean instructions. Any cache clean instructions between these two instructions complete asynchronously. The instructions, and their completion states, may be recorded in a log, as described below. The ASB instruction takes one address operand. The operand value is used for notification—for example it may be written to log once all instructions between it and "start" complete. The "start", while not necessary, may be used to simplify implementation and use. The 'start' and 'barrier' instructions may be used, in effect, to switch the cache controller between a first mode in which write-backs are performed synchronously and a second mode in which write-backs are performed asynchronously. Following a 'barrier' instruction, the completion status of the operations may be queried by the processor.

These mechanisms are described in detail below, however, in the embodiment shown in FIG. 1, write queue 120 and log 122 are stored in cache 116 and is maintained by cache controller 118. Write queue 120 orders data to be transferred from cache 116 to memory system 106 or, optionally, to local or directly coupled memory 124, for example. Log 122 tracks notifications of transfer completion from the memory system. Write queue 120 and log 122 may be stored in cache 116 or in a separate memory, or in combination thereof.

Figure 2:
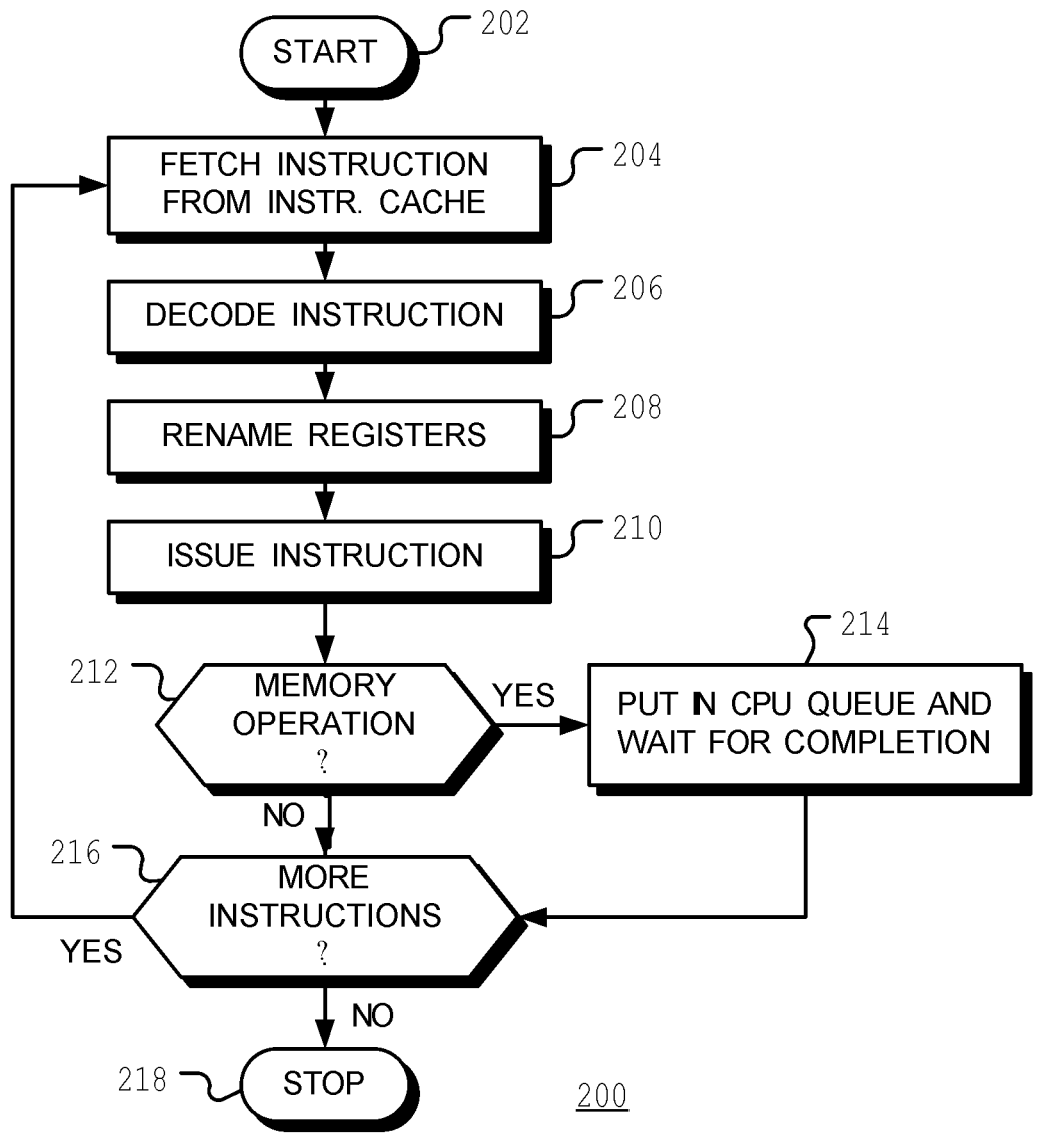
FIG. 2 is a flow chart of a method for executing instructions, in accordance with various representative embodiments.

FIG. 2 is a flow chart 200 of a method for executing instructions. Following start block 202, the central processing unit (CPU) fetches an instruction from an instruction cache at block 204, decodes the instructions at block 206, renames registers in the instruction at block 208 and issues the instruction at block 210. When the instruction is a memory instruction, as depicted by the positive branch from decision block 212, the instruction is placed in a queue (such as a store queue or load queue) in the CPU and the CPU then waits for the operation to complete at block 214. When, for example, a store is to directed to a level 1 cache (L1 cache) of the CPU, the store occurs very quickly. However, when the store is directed to a persistent memory or disc memory, the CPU is stalled for many clock cycles waiting for the operation to complete. Instructions not related to memory operations (indicated by the negative branch from decision block 212) are performed without stalling the CPU. Flow then continues to decision block 216. If there are more instructions to be executed, as depicted by the positive branch from decision block 216, flow returns to block 204. Otherwise, the method terminates at block 218. This method for executing memory instructions is called 'synchronous' and is also called 'blocking', since CPU execution is blocked until completion.

Some Operating Systems provide user functions to accessing disk storage. Such access is very slow compared to cache access, so the operating system may provide asynchronous read/write instructions. However, such operations are not available for memory access, such as persistent memory access. In addition, Operating System calls generally reduce performance.

Figure 3:
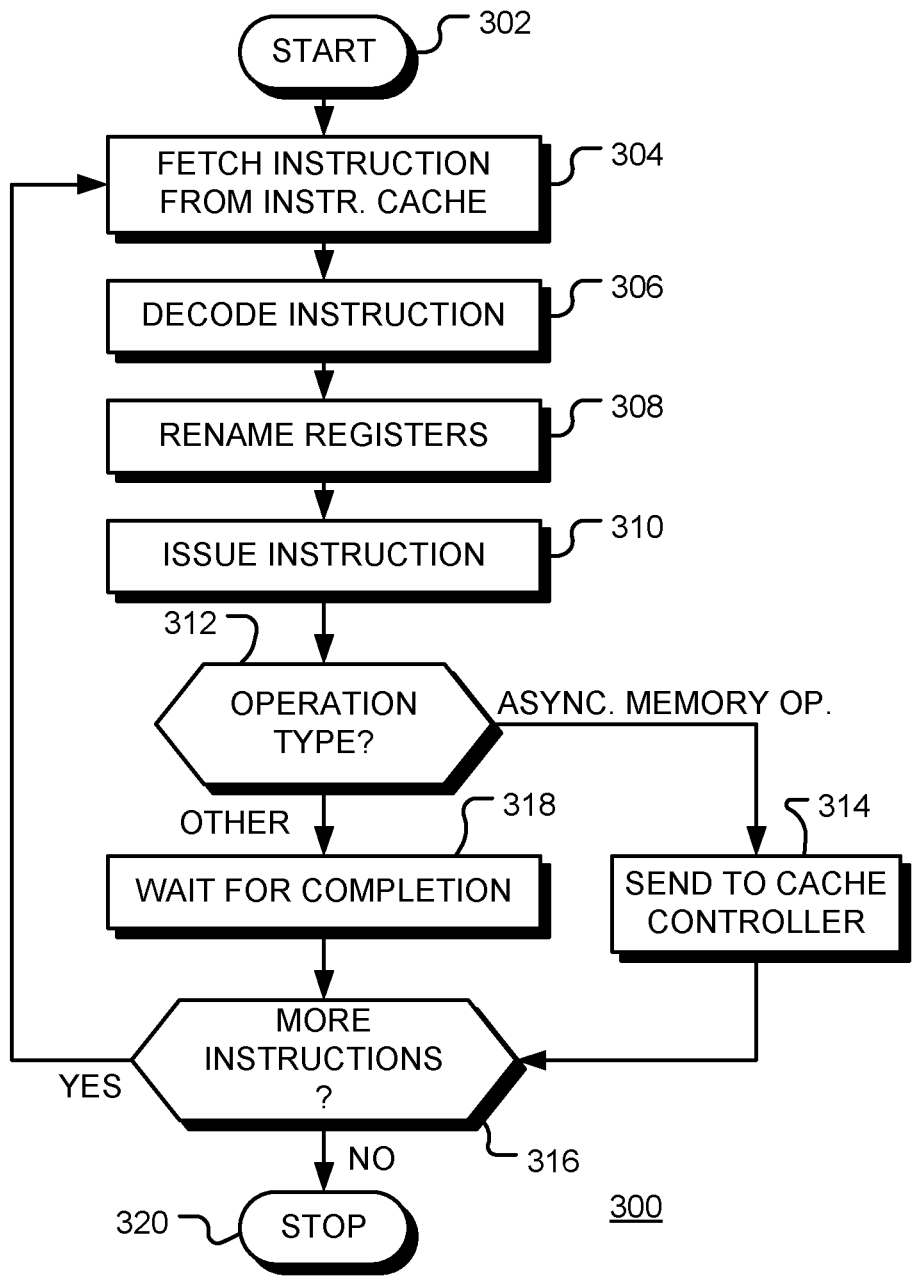
FIG. 3 is a flow chart of a method for executing instructions, in accordance with various representative embodiments.

FIG. 3 is a flow chart 300 of a method for executing instructions in accordance with embodiments of the disclosed mechanism. As in prior systems, following start block 302, the central processing unit (CPU) fetches an instruction from an instruction cache at block 304, decodes the instructions at block 306, renames registers in the instruction at block 308 and the instruction is issued at block 310. When the instruction indicates an asynchronous memory operation, as depicted by the 'ASYNC. MEMORY OP.' branch from decision block 312, the instruction is passed to the cache controller at block 314. An asynchronous cache operation is one that is non-blocking from the core's perspective. Notification of completion of the operation may also occur asynchronously through an alternate pathway. The instruction may, for example, call for transferring data from the cache to another level of memory or to storage. For example, the operation be writing-back (cleaning) a line of the cache to persistent memory, or configuring the cache controller to start or stop logging the completion status of write-backs from cache. Such instructions may be used, for example, to ensure a consistent state of stored data in the event of a power failure and to avoid corruption of data structures. Once the instruction has been passed to the cache controller, the cache controller may indicate completion of the instruction (rather than wait for completion of the requested operation), and flow continues to decision block 316 for continued operation. In contrast to a synchronous memory operation, the CPU is not stalled while the operation completes in the cache. Thus, the memory operation is 'non-blocking'. Rather, the cache provides a facility by which the CPU can determine if a particular write operation, or series of operations, has completed or not. In one embodiment, the log, or a property of the log (such as a number of complete or incomplete operations), is accessible by the processor. When the instruction is not an asynchronous cache operation, as depicted by the 'OTHER' branch from decision block 312, the CPU waits for the instruction to complete at block 316.

In one embodiment, asynchronous cache instructions, such as CCA/$Clean instructions, flow into a memory block in CPU backend. The instructions could reside in an existing or modified Load Queue (LQ) or Store Queue (SQ) of the CPU. However, implementation in the Store queue may be simpler since the Load Queue returns data to core and these instructions do not. Unused data fields in the Store Queue, such a field for port identifier, may be repurposed for metadata, such as 'valid' and 'active' information, as described below. While an instruction is resident in-core, the associated cache block is found in the coherent network and is brought into the local cache hierarchy. If data not found anywhere in coherence domain, the instruction can complete. Otherwise, a block pointer (a physical data location in cache) is returned to core. The core then initiates a new transaction type with local private caches to flush data at this block pointer. When acknowledgement is received from the cache, the instruction leaves the core having not yet completed. Thus, the instruction is asynchronous (non-blocking).

Figure 4:
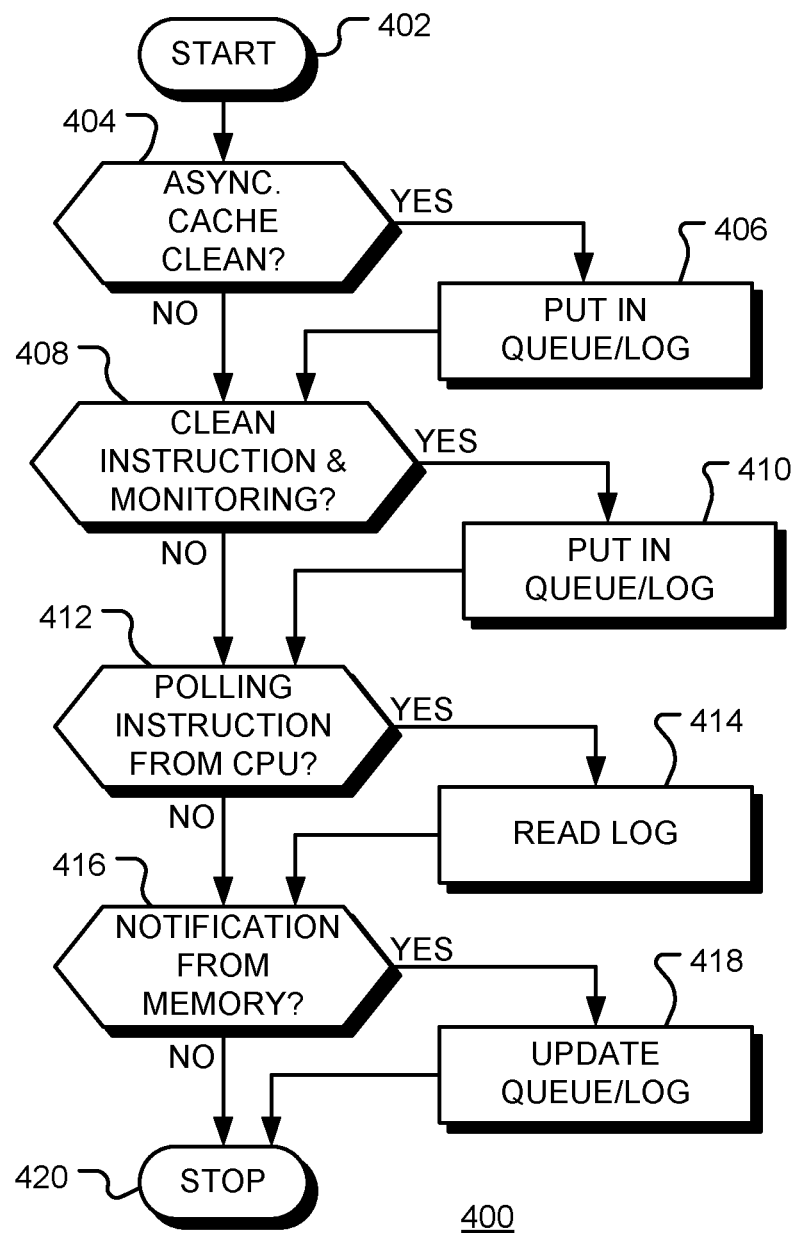
FIG. 4 is a flow chart of a method of operation for a cache controller, in a data processing system, in accordance with various representative embodiments.

FIG. 4 is a flow chart 400 of a method of operation of a cache controller, in accordance with various embodiments. Following start block 402, when the cache controller receives an asynchronous cache clean (CCA) instruction from the central processing unit (CPU), as depicted by the positive branch from decision block 404, a store queue is updated with the corresponding the virtual address and cache block pointer at block 406. A notification log may also be updated. When the instruction is a cache clean instruction and the cache controller is configured to monitor such operations, as depicted by the positive branch from decision block 408, the store queue is updated with the corresponding the virtual address and cache block pointer at block 410. The cache controller may be configured to start and stop monitor such operations by user instructions from the CPU. Notifications of completions for monitored cache cleans may be stored in the cache log. The cache log, or status derived therefrom, may be read or polled by a user application. This enables a user application to continue executing instructions until a point where completion of all of the cache clean instructions is needed for data integrity, for example. Thus, when the instruction is a polling instruction, as depicted by the positive branch from decision block 412, the log is read at block 414 and the completion status is returned to the CPU. Finally, when the cache controller receives a notification from the memory system of completion of a cache clean instruction, as depicted by the positive branch from decision block 416, the queue and log are updated at block 418. The method terminates at block 420. In this manner, a user application may perform asynchronous write-back of cache blocks to memory, such as a persistent memory, and obtain completion status information from the cache controller.

The cache controller tracks pending asynchronous cache operations. For example, store instructions, such as cache clean instructions, may be stored in a queue. In one embodiment, the cache controller uses its own data blocks for an in-cache store queue (abbreviated as '$SQ') of arbitrary length. The tag array may be appropriately extended to accommodate cache lines in this state. A register "HP$SQ" is provided to store a Head Pointer for the in-cache store queue, i.e. a pointer to a cache block that is at the head of the store queue in cache controller. The register "HP$SQ" is accessible by the cache controller and the cache controller circuitry is extended to read block pointers from this queue. This may be done in first-in, first-out (FIFO) order for example. When $SQ sends a write-back-to-persistent-memory command, the status of the corresponding entry in the $SQ is updated. The response logic of the data processing system is configured to handle transactions emanating from the in-cache store queue. In one embodiment, the $SQ arbitrates for memory interface at lower priority than demand traffic (such as the write-back of a line evicted from the cache to make space for new data). The $SQ circuitry changes the HP$SQ register when that block contains no more valid entries.

Figure 5:
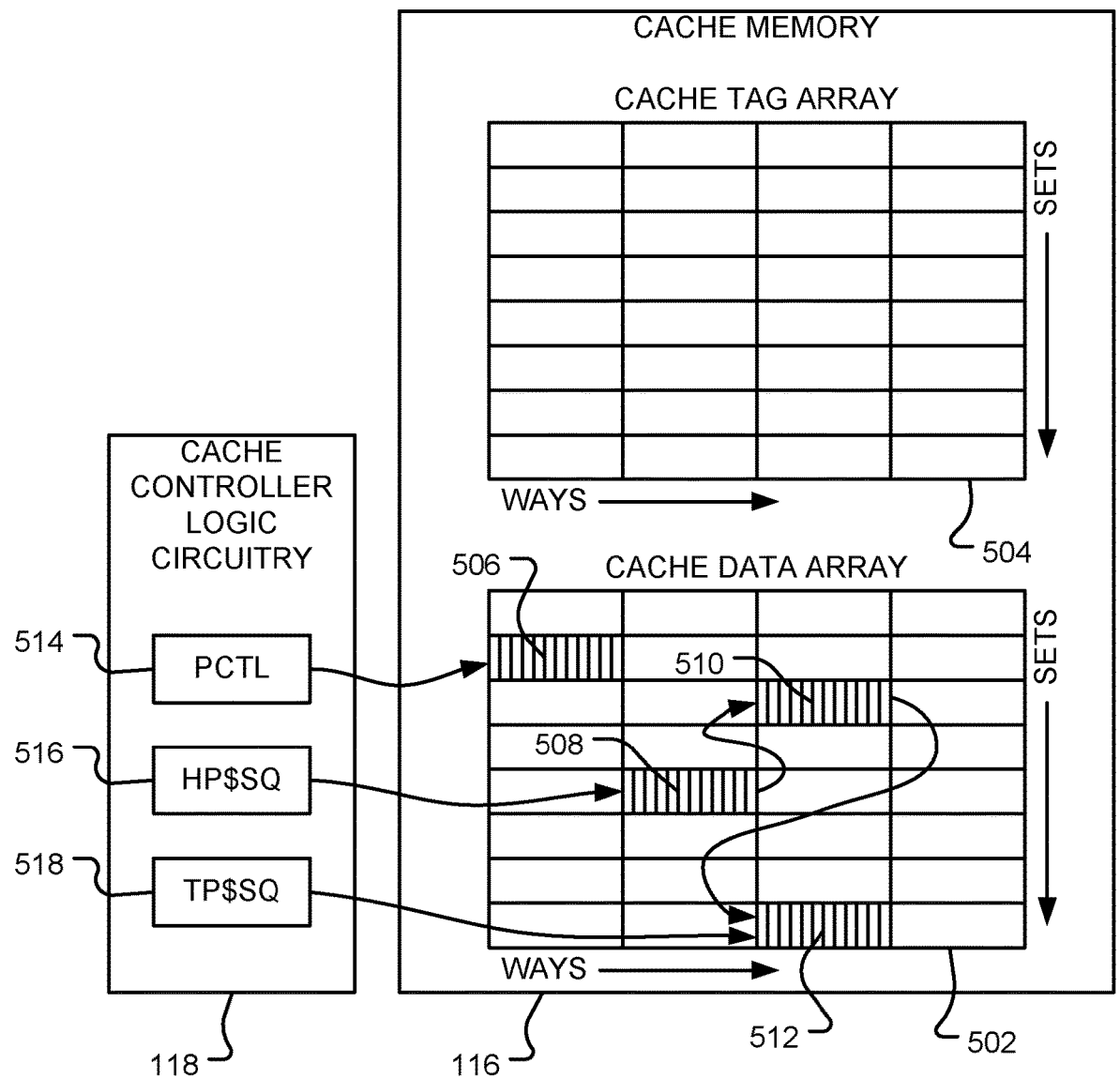
FIG. 5 is a block diagram of cache system, in accordance with various representative embodiments.

FIG. 5 is a block diagram of cache system, in accordance with various representative embodiments. The cache system includes cache memory 116 and cache controller 118. Cache memory 116 includes a cache data array 502 and a cache tag array 504 accessible by cache controller 118. Cache data array 502 may be configured for storing data in blocks. Logically, the blocks may be configured as an array indexed by sets and ways. Data associated with a given address is stored in a particular set (row of the array) at any way (column of the array). The blocks may be indicated by a block pointer. Typically, the set index is determined by a subset of the bits of the address, and a position (or offset) within a block is determined by a further subset of the bits. The remaining bits of the address are stored in tag array 504.

In the embodiment shown in FIG. 5, an in-cache log and an in-cache queue are stored in the cache data array 502. The block pointer to the log (block 506) is stored in register 514 (labelled "PCTL" for "pointer to cache transaction log"). The queue is stored as a linked list. In this simplified example, the linked list utilizes blocks 508, 510 and 512 of the cache data array 502. A block pointer for the head of the linked list (block 508) is stored in register 516 (labelled "HP$SQ" for "Head Pointer to in-cache Store Queue"). A block pointer for the tail of the linked list (block 512) is stored in register 518 (labelled "TP$SQ" for "Tail Pointer to in-cache Store Queue"). These registers are located in the cache controller 118. Each block in the linked list contains a pointer to the next block in the list. Thus, block 508 contains a block pointer to block 510 and block 510 contains a block pointer to block 512, as indicated by the arrows in FIG. 5.

In the event of a context switch, the values in registers 514, 516 and 518, and the values in the cache arrays may be saved to memory.

Figure 6:
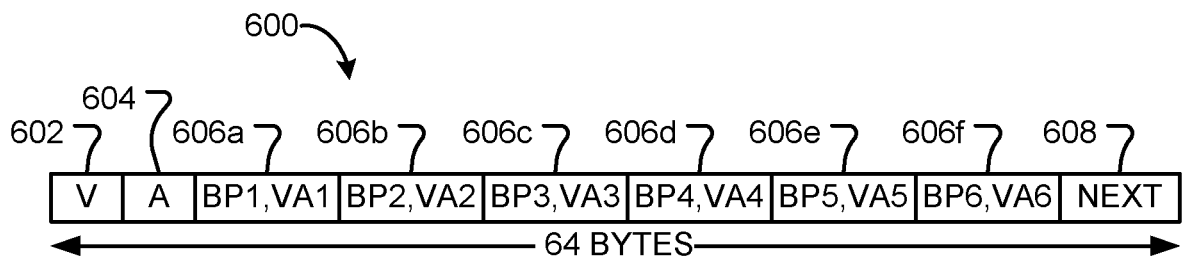
FIG. 6 is a diagrammatic representation of a format of a block in an in-cache linked list, in accordance with various representative embodiments.

FIG. 6 is a diagrammatic representation of a format of a block 600 in an in-cache linked list, in accordance with various representative embodiments. The linked list functions as an in-cache store queue. In the example shown, which is for a block size of 64-bytes (512-bits), the block format includes six validity bits 602, six active (request initiated) bits 604, a block pointer (BP) and virtual address (VA) for each of six queue entries (606a-606f), and pointer (NEXT) 608 to the next block in the linked list. For example, each entry (606a-606f) may contain a 16-bit block pointer, a 64-bit virtual address, totaling 480 bits for the six entries. Six valid bits, six active bits and another 16-bit block pointer give a total of 508 bits.

In a further embodiment, for use with an asynchronous store barrier, each entry includes 16-bits for block pointers to pending writes and 3-bits for metadata (valid, request initiated and barrier or flush data). 26 such entries occupy 494-bits, with the NEXT pointer occupying 16-bits for a total of 510-bits.

It will apparent to those skilled in the art that other formats may be used without departing from the present disclosure. The format may include metadata, such as validity bits and 'active' bits.

Figure 7:
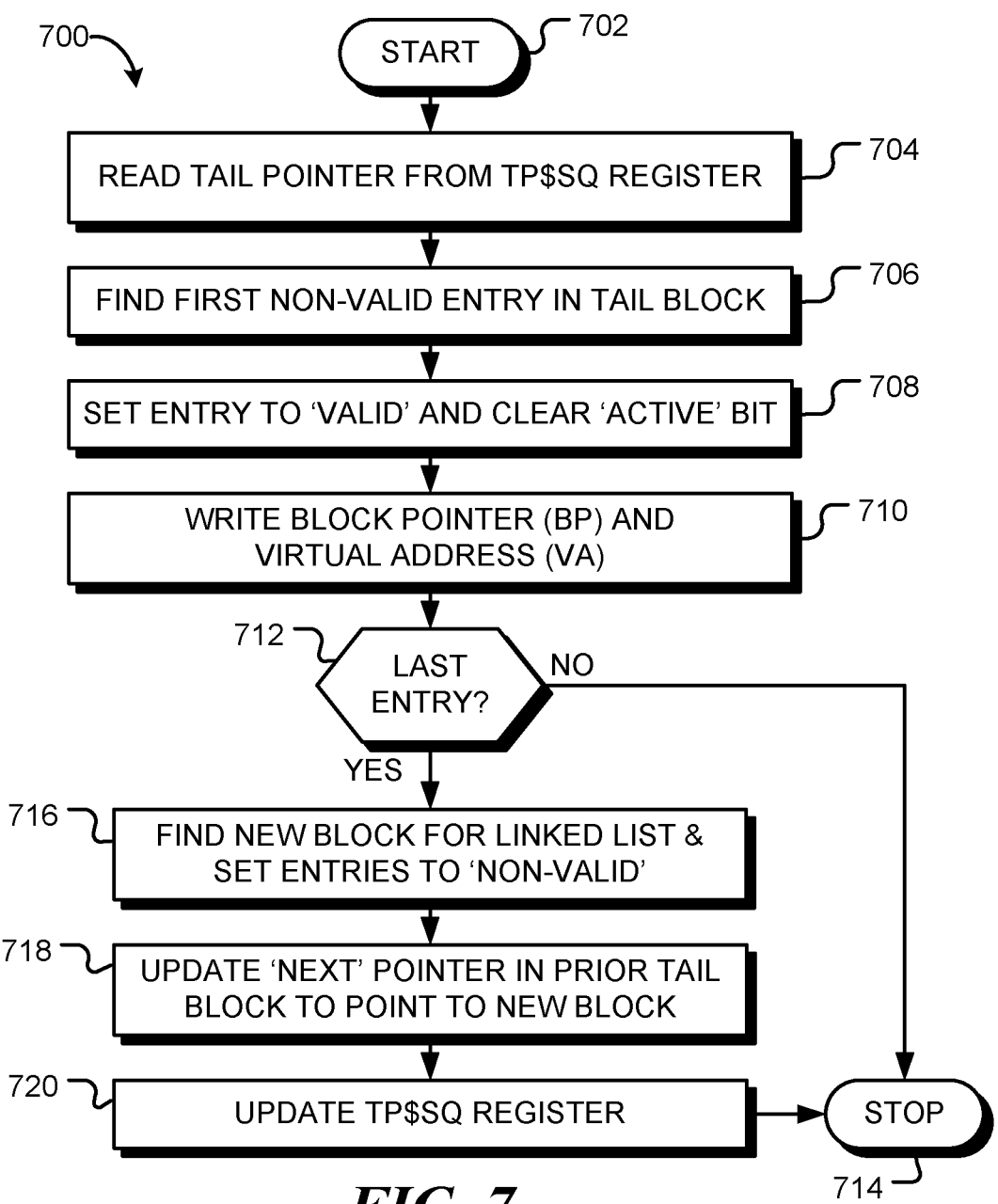
FIG. 7 is a flow chart of a method for adding entries to an in-cache store queue, in accordance with various representative embodiments.

FIG. 7 is a flow chart 700 of a method for adding entries to an in-cache store queue, in accordance with various representative embodiments. Following start block 702, in response to an asynchronous write operation, the cache controller retrieves the tail pointer from the TP$SQ register at block 704. The first non-valid (unused) entry in the corresponding tail block is found at block 706. The metadata of the entry is updated, marking the entry as 'valid' and clearing the associated 'active' (thus marking the request as uninitiated or not yet active) bit at block 708. At block 710, the block pointer (BP) to where the data is stored in the cache and the corresponding virtual address (VA) are written to the entry. If one or more non-valid entries remain in the block, as depicted by the negative branch from decision block 712, the update terminates at block 714. If there are no more non-valid entries in the tail block, as depicted by the positive branch from decision block 712, a new block is found for the linked list at block 716 and the entries are set to 'non-valid'. At block 718, the 'NEXT' pointer in the prior tail block is set to point to the new tail block and, at block 720, the tail pointer register TP$SQ is updated to point to the new tail block. The update is complete and the method terminates at block 714.

Figure 8:
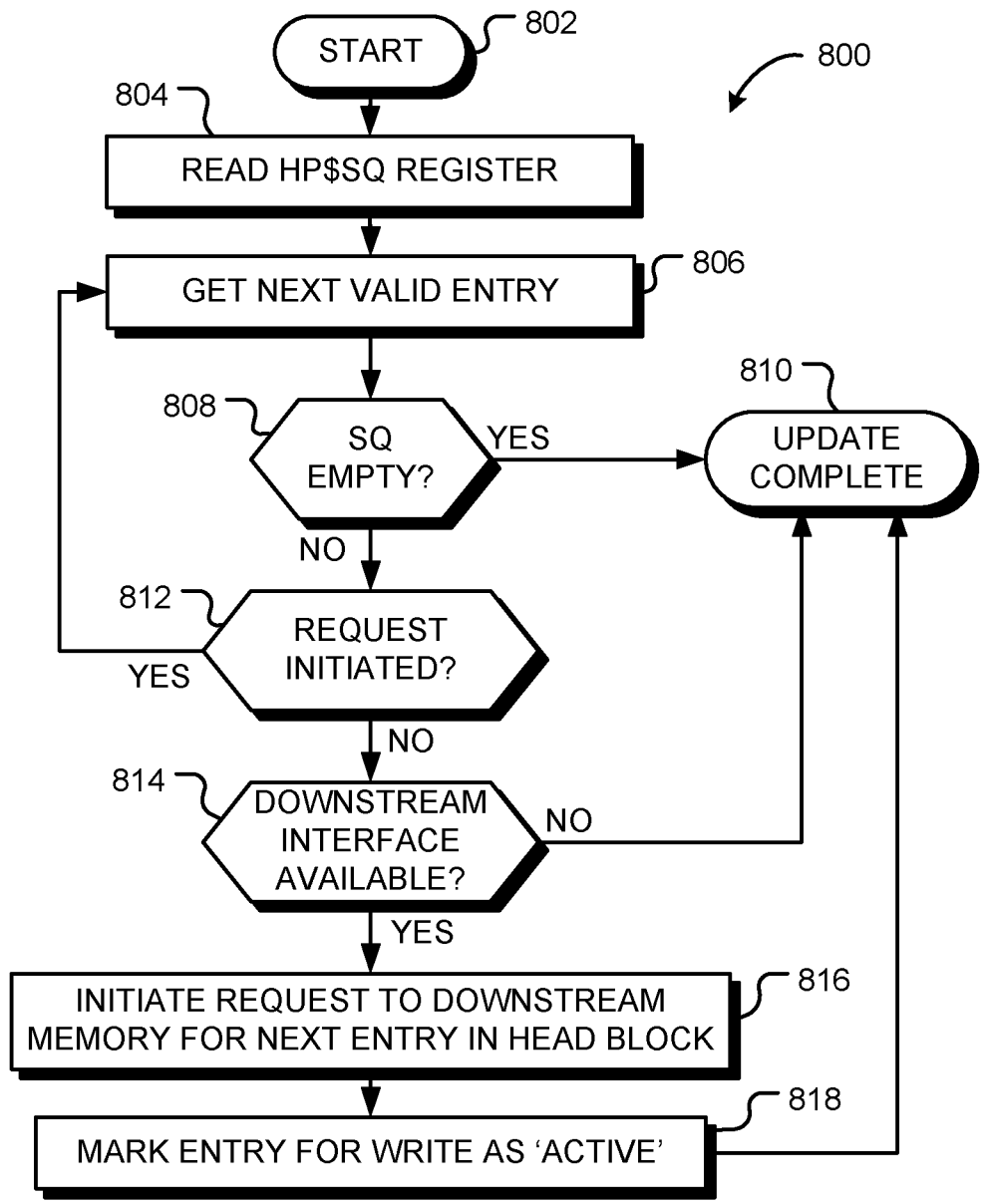
FIG. 8 is a flow chart of a method for initiating memory requests from a cache controller, in accordance with various representative embodiments.

FIG. 8 is a flow chart 800 of a method for initiating requests from an in-cache store queue, in accordance with various representative embodiments. Following start block 802, the cache controller retrieves the pointer to the head block from the head pointer register (HP$SQ register) at block 804. At block 806, the metadata in the head block is read and used to determine the next valid entry in the head block. If there are no valid entries, as indicated by the 'valid' bits, for example, the head block. The head block contains the oldest entries in a FIFO ordering, so if the head block is empty, the queue is empty. When the queue is empty, as depicted by the positive branch from decision block 808, the update for this cycle is complete, as indicated by block 810. If there are valid entries in the head block, the queue is not empty and, as depicted by the negative branch from decision block 808, the 'active' bit for the next valid entry is checked at decision block 810 to determine if a request has been initiated. If the request has been initiated, as depicted by the positive branch from decision block 810, flow returns to block 804. If the request has not yet been initiated, as depicted by the negative branch from decision block 810, a check is made at block 812 to determine if an interface to downstream memory (i.e. memory closer to the target memory) is available. This may involve arbitration between pending cache block evictions or other higher priority tasks. When the interface is not available, as depicted by the negative branch from decision block 814, the cache controller must wait at least until the next cycle and the update for this cycle is complete as indicated by block 810. When the interface is available, as depicted by the positive branch from decision block 814, the cache controller initiates a write request to the downstream memory for the next entry in the head block at block 816 and the entry is marked as 'active' at block 818.

Figure 9:
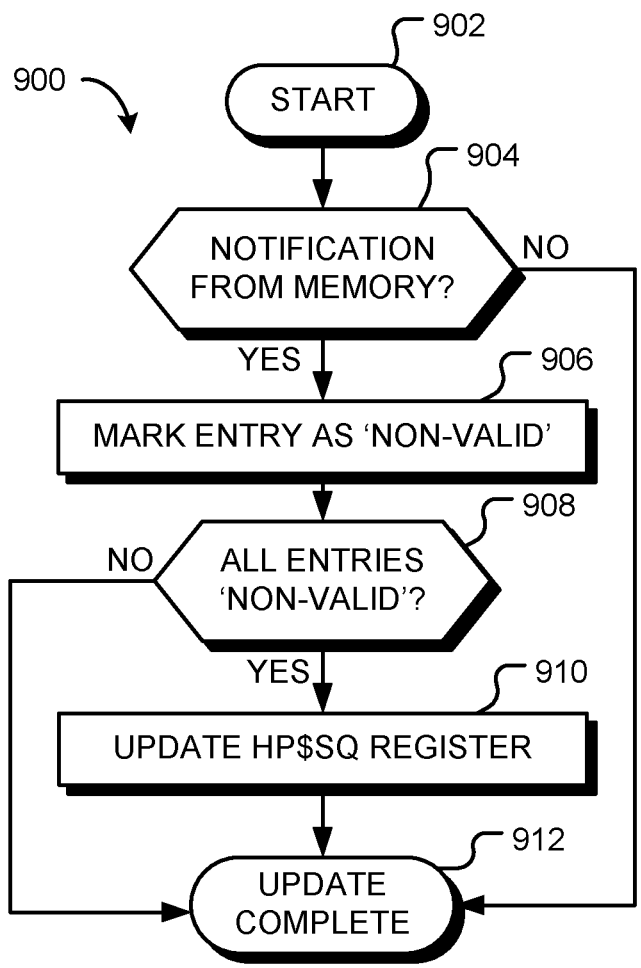
FIG. 9 is a flow chart of a method for processing notifications in a cache controller, in accordance with various representative embodiments.

FIG. 9 is a flow chart 900 of a method for receiving notifications in a cache controller, in accordance with the various embodiments. Following start block 902, a check is made to determine if a notification has been received to indicate that the request has been completed. If a notification has been received, as depicted by the positive branch from decision block 904, the corresponding entry in the store queue is marked as 'non-valid' at block 906 and the log updated to indicate the status of the operation. If all entries are now marked as 'non-valid, as depicted by the positive branch from decision block 908, the HP$SC register is updated, at block 901, to store of the value of the 'NEXT' pointer in the head block. If one or more entries are still marked as 'valid', as depicted by the negative branch from decision block 908, the update is complete as indicated by block 912. If no notification has been received, as depicted by the negative branch from decision block 904, the update for this cycle is complete, as indicated by block 912.

It will be apparent to those of ordinary skill in the art that various operations depicted in FIG. 8 and FIG. 9 may be performed in different orders.

Figure 10:
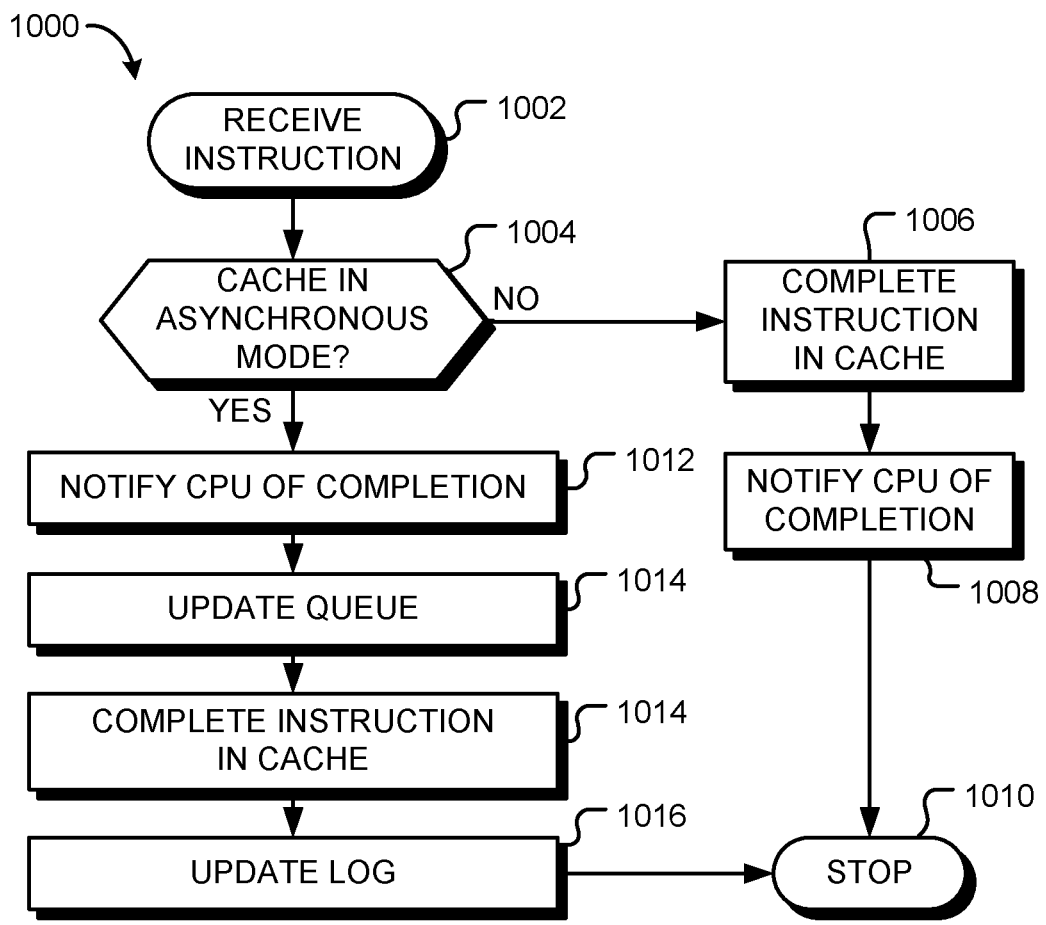
FIG. 10 is a flow chart of a method of operation of a cache controller, in accordance with various representative embodiments.

FIG. 10 is a flow chart 1000 of a method of operation of a cache controller, in accordance with various embodiments. In this embodiment, the cache controller may operate an synchronous mode or an asynchronous mode. For example, the cache controller can enter the asynchronous mode in response to a 'start' instruction from the CPU, and cache controller can return to the synchronous mode in response to a 'stop' or 'barrier' instruction from the CPU. The method begins at block 1002 when an instruction, such as cache clean instruction, is received at the cache controller. When the cache controller is not the asynchronous mode, as depicted by the negative branch from decision block 1004, the instruction completes in cache at block 1006. For example, a write instruction is sent to the memory system and the cache controller waits for a notification (such as an acknowledgement) that the instruction has been completed. The cache controller notifies the CPU of completion at block 1008 and the method terminates at block 1010. When the cache controller is in the asynchronous mode, as depicted by the positive branch from decision block 1004, the cache controller notifies the CPU of completion of the instruction at block 1012 even though the requested operation has not been completed. This frees the CPU to continue processing other instructions and the CPU is not blocked. At block 1014, the cache queue and log are updated with the received instruction. At block 1016, the operation is completed in the cache controller. When notification of completion is received from the memory system, the queue and log are updated at block 1016 and the method terminates at block 1016.

The instructions to change the mode of operation of the cache controller and an instruction to check the status of the log may be included in an instruction set architecture (ISA) and may be implemented in various ways in data processing systems that embodiment the ISA.

In the embodiments described above, an asynchronous memory interface is implemented in a cache controller. However, the disclosed approach is not limited to this implementation. For example, the interface could be implemented using independent circuitry. In such an implementation, synchronous memory operations could be directed to the cache controller for managing data transfer between the cache and the processor, while asynchronous operations are directed to an asynchronous interface for managing data transfer between the cache and the memory system. An asynchronous interface may also be used for managing data transfer between the cache and memory mapped input/output, between the cache and a storage system, and between the cache and a network interface.

The present disclosure provides a data processing system in which hardware components provide facilities for improved operation of the data processing system. An ability to write data back to persistent memory is important in many applications, such as database applications. The disclosed hardware improvement enable data to be written back to persistent memory in an asynchronous manner. In turn, this provides increased performance compared to conventional systems that provide only synchronous write-back or rely on Operating System calls for the write-back.

The new features may be included in an instruction set architecture and implemented in hardware in various ways.

The present disclosure could be implemented using hardware component such as special purpose hardware and/or dedicated processors which are equivalents to the disclosure as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

Accordingly, some aspects and features of the disclosed embodiments are set out in the following paragraphs:

In one embodiment, a method of operation of a data processing system, comprises receiving, from a processor of the data processing system at a cache controller of the data processing system, a first instruction to perform a memory operation; indicating, by the cache controller, completion of the first instruction to the processor; initiating the memory operation by the cache controller; recording, by the cache controller, an entry in a log, the entry indicating a status of the memory operation; and responsive to a notification of completion of the memory operation, the cache controller updating the entry in the log indicating the status of the memory operation, where the log, or a property of the log, is accessible by the processor.

In another embodiment of the method, initiating the memory operation by the cache controller comprises: writing a new entry for the memory operation in an operation queue; storing metadata data for the new entry; when a memory interface is available: accessing an uninitiated entry of the operation queue; initiating a memory operation via the memory interface in accordance with accessed entry; and updating the metadata for the entry to indicate that the memory operation has been initiated; and responsive to a notification of completion of the memory operation: updating metadata for the completed memory operation to indicate that the memory operation has been completed; and marking an entry in the operation queue, corresponding to the completed memory operation, as non-valid.

In another embodiment of the method, the operation queue comprises a linked list stored in one or more linked blocks of a cache data array of the data processing system, the linked block having a tail block and a head block, and where writing the entry for the memory operation in the operation queue comprises: accessing a tail pointer register to retrieve a block pointer to the tail block; accessing the tail block to find a non-valid entry; updating the non-valid entry for the memory operation; and when the tail block has no non-valid entry: updating a 'next' pointer in the tail block to point to a new tail block in the data array; and updating the tail pointer register to point to the new tail block.

In another embodiment of the method, the operation queue comprises a linked list stored in one or more linked blocks of a cache data array of the data processing system, the linked blocks having a tail block and a head block, and where writing the new entry for the memory operation in the operation queue comprises: accessing a head pointer register to retrieve a block pointer to the head block; accessing the head block to find a non-valid entry; updating the non-valid entry for the memory operation; and marking the updated entry as 'valid' and 'uninitiated'.

In another embodiment, the method further comprises, responsive to the notification of completion of the memory operation: when all entries of the head block are marked as non-valid and the operation queue is not empty: updating the head pointer register to store a 'next' block pointer from head block, where the 'next' pointer identifies a next block in the linked list.

In another embodiment of the method, the memory operation comprises writing back to memory data stored in a first block in a cache data array of the data processing system.

In another embodiment of the method, the memory comprises a persistent memory.

In another embodiment of the method, recording, by the cache controller, the entry indicating the status of the memory operation in the log comprises storing in the log: a block pointer to the first block; an indication that the first block has not yet been initiated; and an indication that the first block has not yet been completed.

In another embodiment, the method further comprises, determining, from the first instruction, when the memory operation is to be performed asynchronously.

In another embodiment, the method further comprises, responsive to a second instruction from the processor, the cache controller tracking a completion status for memory operations corresponding to one or more first instructions received prior to the second instruction.

In one embodiment, a data processing system comprises a processor; a memory system, a cache controller that provides an asynchronous interface between the processor and the memory system; and a cache accessible by the processor via the cache controller, where one or more first instructions, issued by the processor to the cache controller, for one or more first memory operations, are completed by the cache controller without blocking the processor, where the cache controller tracks a completion status of the one or more first memory operations, and where the cache controller enables the completion status of the one or more first memory operations to be queried by the processor.

In another embodiment of the data processing system, cache controller is configured to initiate the first memory operation in the memory system, and where the memory system is configured to notify the cache controller when the first memory operation is complete.

In another embodiment of the data processing system, the cache controller is configured to place the one or more first memory operations in an operation queue and where the one or more memory operations are initiated from the operation queue.

In another embodiment of the data processing system, the data processing system further comprises a data array, accessible by the cache controller, for storing the operation queue.

In another embodiment of the data processing system, the data array is in the cache and where data processing system further comprises: a head pointer register for storing a pointer to a head of the operation queue; and a tail pointer register for storing a pointer to a tail of the operation queue, where the head and tail pointers are accessible by the cache controller.

In another embodiment of the data processing system, the completion status of the first memory operation is stored in a log, the data processing system further comprising: a data array comprising a plurality of blocks, where the log is stored in one or more blocks of the data array; and a first register for storing a block pointer to the one or more blocks of the data array that store the log, where the first register is accessible to the cache controller to enable the cache controller to access the log.

In another embodiment of the data processing system, the memory system comprises a persistent memory.

In another embodiment of the data processing system, an instruction set architecture of the data processing system comprises an instruction to clean data in the cache to the persistent memory.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method of operation of a data processing system, the method comprising:
   receiving, from a processor of the data processing system at a cache controller of the data processing system, a first instruction to perform a first memory operation;
   indicating, by the cache controller, completion of the first instruction to the processor;
   initiating the first memory operation in the cache controller, including:
      writing a new entry for the first memory operation in an operation queue;
      storing metadata for the new entry; and
      recording an entry in a log, the entry indicating a status of the first memory operation, where the log, or a property of the log, is accessible by the processor;
   accessing an entry of the operation queue for an uninitiated second memory operation;
   initiating the second memory operation in a memory system via a memory interface in accordance with accessed entry;
   updating the metadata for the entry to indicate that the second memory operation has been initiated;
   providing, by the memory system to the cache controller, notification of completion of the second memory operation;
   responsive to receiving the notification of completion of the second memory operation:
      updating the entry in the log indicating the status of the second memory operation;
      updating metadata for the completed second memory operation to indicate that the second memory operation has been completed; and
      marking the entry in the operation queue, corresponding to the completed second memory operation, as non-valid.

2. The method of claim 1, where the operation queue comprises a linked list stored in one or more linked blocks of a cache data array of the data processing system, the linked block having a tail block and a head block, and where writing the entry for the first memory operation in the operation queue comprises:
   accessing a tail pointer register to retrieve a block pointer to the tail block;
   accessing the tail block to determine if the tail block has a non-valid entry;
   if the tail block has a non-valid entry:
      updating the non-valid entry for the first memory operation; and
   if the tail block has no non-valid entry:
      updating a 'next' pointer in the tail block to point to a new tail block in the cache data array; and
      updating the tail pointer register to point to the new tail block.

3. The method of claim 1, where the operation queue comprises a linked list stored in one or more linked blocks of a cache data array of the data processing system, the linked blocks having a tail block and a head block, and where writing the new entry for the first memory operation in the operation queue comprises:
   accessing a head pointer register to retrieve a block pointer to the head block;
   accessing the head block to find a non-valid entry;
   updating the non-valid entry for the first memory operation; and
   marking the updated entry as 'valid' and 'uninitiated'.

4. The method of claim 3, further comprising, responsive to the notification of completion of the second memory operation:
   responsive to determining that all entries of the head block are marked as non-valid and the operation queue is not empty:
      updating the head pointer register to store a 'next' block pointer from head block, where the 'next' block pointer identifies a next block in the linked list.

5. The method of claim 1, where the first memory operation comprises writing back, to the memory system, data stored in a first block in a cache data array of the data processing system.

6. The method of claim 5, where the memory system comprises a persistent memory.

7. The method of claim 5, where recording, by the cache controller, the entry indicating the status of the first memory operation in the log comprises storing in the log:
   a block pointer to the first block;
   an indication that said writing back, to the memory system, data stored in the first block has not yet been initiated; and
   an indication that said writing back, to the memory system, data stored in the first block has not yet been completed.

8. The method of claim 1, further comprising:
   determining, from the first instruction, when the first memory operation is to be performed asynchronously.

9. The method of claim 1, further comprising:
   receiving, from the processor at the cache controller, an asynchronous-store barrier (ASB) instruction; and
   responsive to receiving the ASB instruction from the processor, the cache controller tracking a completion status for memory operations corresponding to one or more first instructions received prior to the ASB instruction.

10. A data processing system comprising:
   a processor;
   a memory system;
   a cache controller configured to provide an asynchronous interface between the processor and the memory system; and
   a cache accessible by the processor via the cache controller,
   where one or more first instructions, issued by the processor to the cache controller, for one or more first memory operations, are completed by the cache controller without blocking the processor,
   where the memory system is configured to send a notification of completion for a memory operation initiated by the cache controller, and
   where the cache controller is configured to track a completion status of memory operations of the one or more first memory operations, including:
      responsive to receiving a first instruction, from the processor, to perform a first memory operation:
         indicate completion of the first instruction to the processor,
         write a new entry for the first memory operation in an operation queue, store metadata for the new entry, and record an entry in a log, the entry indicating a status of the first memory operation, where the log, or a property of the log, is accessible by the processor, access an entry of the operation queue for an uninitiated second memory operation, initiate the second memory operation in the memory system in accordance with accessed entry, update metadata for the entry to indicate that the second memory operation has been initiated, receive, from the memory system, notification of completion of the second memory operation, responsive to receiving the notification of completion of the second memory operation:

update the entry in the log indicating the status of the second memory operation, update metadata for the completed second memory operation to indicate that the second memory operation has been completed, and mark the entry in the operation queue, corresponding to the completed second memory operation, as non-valid.

11. The data processing system of claim 10, where the memory system is configured to notify the cache controller when the first memory operation is complete.

12. The data processing system of claim 10, where the data processing system further comprises a data array, accessible by the cache controller, for storing the operation queue.

13. The data processing system of claim 12, where the data array is in the cache and where the data processing system further comprises:

a head pointer register for storing a pointer to a head of the operation queue; and a tail pointer register for storing a pointer to a tail of the operation queue, where the head and tail pointers are accessible by the cache controller.

14. The data processing system of claim 10, where the completion status of the first memory operation is stored in the log, the data processing system further comprising:

a data array comprising a plurality of blocks, where the log is stored in one or more blocks of the data array; and a first register for storing a block pointer to the one or more blocks of the data array that store the log, where the first register is accessible to the cache controller to enable the cache controller to access the log.

15. The data processing system of claim 10, where the memory system comprises a persistent memory.

16. The data processing system of claim 15, where an instruction set architecture of the data processing system comprises an instruction to clean data in the cache to the persistent memory.

* * * * *